US010956769B2

(12) United States Patent
Huang (10) Patent No.: US 10,956,769 B2
(45) Date of Patent: *Mar. 23, 2021

(54) METHOD AND SYSTEM FOR EVALUATING AN OBJECT DETECTION MODEL

(71) Applicant: Advanced New Technologies Co., Ltd., Grand Cayman (KY)

(72) Inventor: Jiangbo Huang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/944,985

(22) Filed: Jul. 31, 2020

(65) Prior Publication Data

US 2020/0387735 A1    Dec. 10, 2020

Related U.S. Application Data

(63) Continuation of application No. 16/792,035, filed on Feb. 14, 2020.

(30) Foreign Application Priority Data

Jun. 10, 2019   (SG) ........................ 10201905273V (51) Int. Cl.
  *G06K 9/72*    (2006.01)
  *G06K 9/46*    (2006.01)
  (Continued)

(52) U.S. Cl.
  CPC ............... *G06K 9/46* (2013.01); *G06T 7/70* (2017.01); *G06T 11/20* (2013.01); *G06K 2209/01* (2013.01); *G06T 2210/12* (2013.01)

(58) Field of Classification Search
  None
  See application file for complete search history.

(56) References Cited

U.S. PATENT DOCUMENTS 5,689,620 A    11/1997   Kopec et al.
2018/0032840 A1   2/2018   Yu et al.
(Continued)

FOREIGN PATENT DOCUMENTS

| CN | 106682619 | 5/2017 |
| CN | 108319949 | 7/2018 |
| CN | 109858569 | 6/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Sean M Conner
(74) *Attorney, Agent, or Firm* — Fish & Richardson P.C.

(57) ABSTRACT

Disclosed herein are computer-implemented methods, computer-implemented systems, and non-transitory, computer-readable media for evaluating performance of an object detection model. One computer-implemented method includes generating a predicted bounding box representing an object based on the object detection model, where the object is positioned proximate to one or more adjacent objects. An area of intersection is determined between the predicted bounding box and a groundtruth bounding box of the object. A modified area of union is determined between the predicted bounding box and the groundtruth bounding box of the object. A score equal to the area of intersection between the predicted bounding box and the groundtruth bounding box of the object divided by the modified area of union is determined, where the score represents the performance of the object detection model.

15 Claims, 5 Drawing Sheets

(51) Int. Cl.
*G06T 7/70* (2017.01)
*G06T 11/20* (2006.01)

(56) References Cited

U.S. PATENT DOCUMENTS

2018/0108137 A1  4/2018  Price et al.
2018/0315188 A1  11/2018  Tegzes et al.

OTHER PUBLICATIONS

Nakamoto, "Bitcoin: A Peer-to-Peer Electronic Cash System," www.bitcoin.org, 2005, 9 pages.

Wang, et al., "Repulsion loss: detecting pedestrians in a crowd," 2018 IEEE/CVF Conference on Computer Vision and Pattern Recognition, Jun. 23, 2018, pp. 7774-7783.

Yu et al., "Unitbox: An advanced object detection network.", Proceedings of the 24th ACM International Conference on Multimedia, 2016.

Rong et al., "Recognizing text-based traffic guide panels with cascaded localization network.", European Conferences on Computer Vision, 2016.

METHOD AND SYSTEM FOR EVALUATING AN OBJECT DETECTION MODEL

CROSS-REFERENCE TO RELATED APPLICATIONS

This application is a continuation of U.S. application Ser. No. 16/792,035, filed on Feb. 14, 2020, which is claims priority to Singapore Application No. 10201905273V, filed on Jun. 10, 2019, both of which are hereby incorporated by reference in their entirety.

FIELD OF INVENTION

The present invention relates broadly, but not exclusively, to methods and systems for evaluating an object detection model, and to object detection method and devices.

BACKGROUND

Optical character recognition (OCR) is the mechanical or electronic conversion of images of typed, handwritten or printed text into machine-encoded text, whether from a scanned document, a photo of a document, a scene-photo or from subtitle text superimposed on an image, etc. To recognise the text, the first step is to detect bounding boxes of each text segment. Algorithms for detection of text belong to a field named object detection in computer vision.

In object detection, intersection over union (IoU) is a common standard metric used to evaluate the accuracy of a detector and model selection. The traditional IoU formula is defined as "area of intersection between predicted bounding box and groundtruth bounding box divided by area of union between predicted bounding box and groundtruth bounding box". This formula works well for most cases. However, in the case of text detection, the traditional IoU may fail to select the best models/parameters and thus using the traditional IoU may significantly reduce the final accuracy of text recognition.

For example, the traditional IoU formula fails to consider at least two conditions, namely, (1) both a smaller intersection and a greater union lead to a similarly smaller IoU; however, for text detection a smaller intersection is worse than a greater union because it may cause some regions of text to be lost and affect the following OCR result, and (2) the traditional IoU does not consider the intersection between a predicted textbox and other groundtruth textboxes. Without considering these two conditions, a higher IoU value may not necessarily indicate a better model.

A need therefore exists to provide methods and devices that can improve the evaluation of object detection models for text detection.

SUMMARY

A first aspect of the present disclosure provides a method for evaluating performance of an object detection model. The method includes generating a predicted bounding box representing an object based on the object detection model, wherein the object is positioned proximate to one or more adjacent objects; determining an area of intersection between the predicted bounding box and a groundtruth bounding box of the object; and determining a modified area of union between the predicted bounding box and the groundtruth bounding box of the object. Determining the modified area of union includes determining a weighted area of union between the predicted and groundtruth bounding boxes based on one or more weights; and adding to the weighted area of union an area of intersection between the predicted bounding box and at least one groundtruth bounding box of the one or more adjacent objects. The method further includes determining a score equal to the area of intersection between the predicted bounding box and the groundtruth bounding box of the object divided by the modified area of union. The score represents the performance of the object detection model.

A second aspect of the present disclosure provides an object detection method. The method includes receiving unlabeled actual data and a plurality of object detection models, wherein the object detection models are generated by a neural network based on labeled training data; evaluating each of the object detection models with validation data using the method as defined in the first aspect to identify the object detection model having the highest score; and detecting an object in the unlabeled actual data based on the identified object detection model.

A third aspect of the present disclosure provides a system for evaluating an object detection model. The system includes a processor, and a computer-readable memory coupled to the processor and having instructions stored thereon. The instructions are executable by the processor to generate a predicted bounding box representing an object based on the object detection model, wherein the object is positioned proximate to one or more adjacent objects; determine an area of intersection between the predicted bounding box and a groundtruth bounding box of the object; and determine a modified area of union between the predicted bounding box and the groundtruth bounding box of the object. The modified area of union is a sum of a weighted area of union between the predicted and groundtruth bounding boxes based on one or more weights; and an area of intersection between the predicted bounding box and at least one groundtruth bounding box of the one or more adjacent objects. The instructions are also executable by the processor to determine a score equal to the area of intersection between the predicted bounding box and the groundtruth bounding box of the object divided by the modified area of union. The score represents the performance of the object detection model.

A fourth aspect of the present disclosure provides an apparatus comprising an object detection module configured to generate a predicted bounding box representing an object based on an object detection model, wherein the object is positioned proximate to one or more adjacent objects, and an evaluation module. The evaluation module is configured to determine an area of intersection between the predicted bounding box and a groundtruth bounding box of the object; and determine a modified area of union between the predicted bounding box and the groundtruth bounding box of the object. The modified are of union is a sum of a weighted area of union between the predicted and groundtruth bounding boxes based on one or more weights; and an area of intersection between the predicted bounding box and at least one groundtruth bounding box of the one or more adjacent objects. The evaluation module is further configured to determine a score equal to the area of intersection between the predicted bounding box and the groundtruth bounding box of the object divided by the modified area of union; and evaluate a performance of the object detection model based on the score.

A fifth aspect of the present disclosure provides an object detector. The object detector includes a receiver module configured to receive unlabeled actual data and a plurality of object detection models. The object detection models are generated by a neural network based on labeled training data. The object detector also includes the apparatus as defined in the fourth aspect coupled to the receiver module and configured to evaluate each of the object detection models with validation data to identify the object detection model having the highest score. The object detection module is further configured to detect an object in the unlabeled actual data based on the identified object detection model.

BRIEF DESCRIPTION OF THE DRAWINGS

Embodiments of the invention will be better understood and readily apparent to one of ordinary skill in the art from the following written description, by way of example only, and in conjunction with the drawings, in which.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

The present disclosure provides methods and devices in which an object detection model is evaluated based on an improved IoU formula that takes into account the considerations that (1) for text detection, a smaller intersection is worse than a greater union because it may cause some regions of text to be lost and affect the following OCR result, and (2) for text detection, the intersection between a predicted textbox and other groundtruth textboxes may also adversely affect the following OCR result. As described in more details below, the evaluation is based on a score that not only penalizes a smaller intersection and greater union combination (which the traditional IoU formula does), but also penalizes more on a smaller intersection than on a greater union. In addition, it penalizes an intersection between a predicted textbox and other groundtruth textboxes. Accordingly, given a number of different object detection models, it is possible to identify or select the model that is most suitable for text detection.

Embodiments will be described, by way of example only, with reference to the drawings. Like reference numerals and characters in the drawings refer to like elements or equivalents.

Some portions of the description herein are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "receiving", "calculating", "detecting", "determining", "replacing", "generating", "initializing", "outputting", "evaluating", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description herein.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM, GPRS, 3G or 4G mobile telephone systems, as well as other wireless systems such as Bluetooth, ZigBee, Wi-Fi. The computer program when loaded and executed on such a computer effectively results in an apparatus that implements the steps of the preferred method.

The present invention may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC) or Field Programmable Gate Array (FPGA). Numerous other possibilities exist. Those skilled in the art will appreciate that the system can also be implemented as a combination of hardware and software modules.

According to various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which may be described in more detail herein may also be understood as a "circuit" in accordance with an alternative embodiment.

Figure 1:
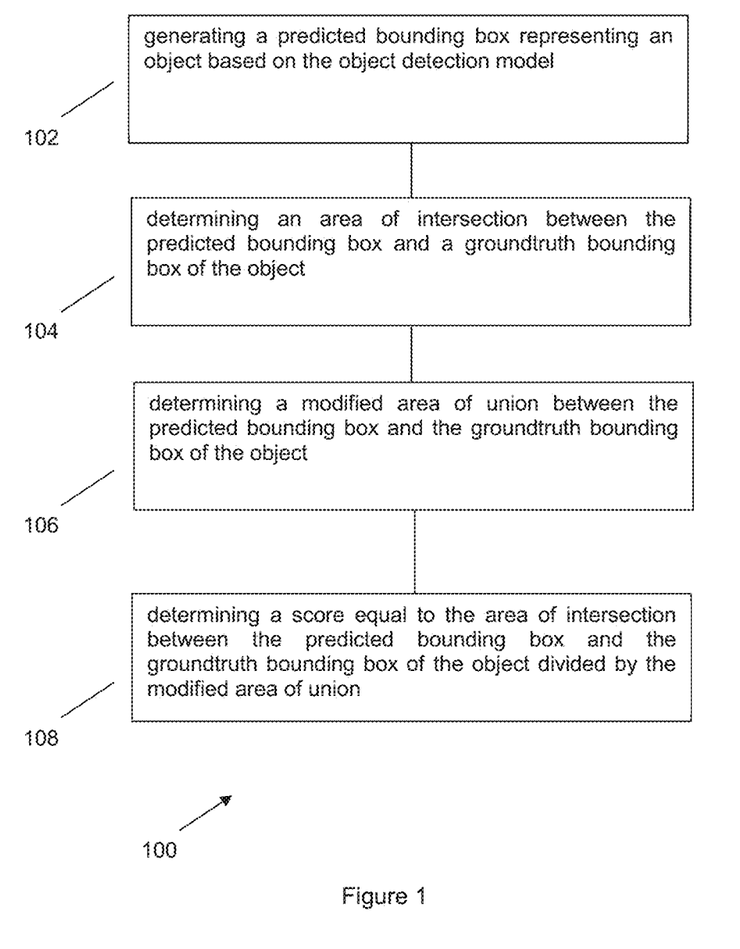
FIG. 1 shows a flow chart illustrating a method for evaluating an object detection model according to an embodiment.

FIG. 1 shows a flow chart 100 illustrating a method for evaluating performance of an object detection model according to an embodiment.

At step 102, a predicted bounding box representing an object is generated based on the object detection model. The object is typically positioned proximate to one or more adjacent objects. For example, the object may be a text string (e.g. a word or phrase) that is proximate to other text strings (e.g. other words and phrases within a sentence or paragraph). Parameters such as size and position of the predicted bounding box may vary from one object detection model to another. The performance of the object detection model is therefore dependent on the predicted bounding box.

At step 104, an area of intersection between the predicted bounding box and a groundtruth bounding box of the object is determined. Typically, a greater area of intersection between the predicted bounding box and the groundtruth bounding box of the object indicates a greater degree of overlap between the bounding boxes and may be more desirable than a smaller area.

At step 106, a modified area of union between the predicted bounding box and the groundtruth bounding box of the object is determined by (1) determining a weighted area of union between the predicted and groundtruth bounding boxes based on one or more weights and (2) adding, to the weighted area of union, an area of intersection between the predicted bounding box and at least one groundtruth bounding box of one or more adjacent objects.

As further illustrated below with reference to FIG. 2a, since the area of union between two objects is a sum of the area of their intersection and the areas of non-intersection, in the present examples, the weighted area of union between the predicted and groundtruth bounding boxes may be determined by assigning appropriate weights to respective constituent areas, including the areas of non-intersection between the predicted bounding box and the groundtruth bounding box of the object.

The area of intersection between the predicted bounding box and at least one groundtruth bounding box of the one or more adjacent objects is further illustrated with reference to FIG. 2b.

The net result of step 106 is a modified area of union that is greater if the predicted bounding box does not overlap well with the groundtruth bounding box of the object and/or overlaps with the groundtruth bounding box(es) of adjacent object(s). Typically, a greater modified area of union is less desirable than a smaller area.

At step 108, a score equal to the area of intersection between the predicted bounding box and the groundtruth bounding box of the object divided by the modified area of union is determined. The score represents the performance of the object detection model. For example, if the object detection model gives rise to a greater modified area of union, the score is lower. On the other hand, if the object detection model gives rise to a smaller modified area of union, the score is higher. A score closer to 1 indicates a greater object detection accuracy.

Figure 2A:
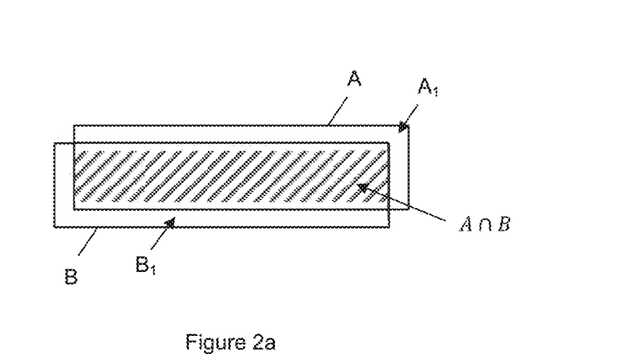
FIGS. 2a and 2b show schematic diagrams illustrating an implementation to determine the modified area of union in the method of FIG. 1.
Figure 2B:
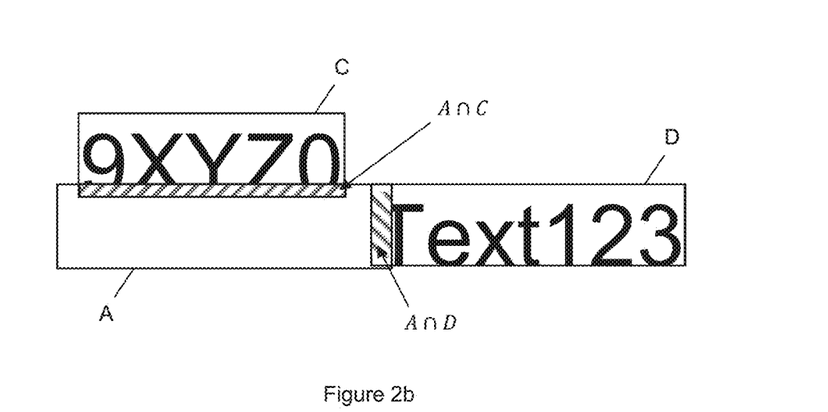

FIGS. 2a and 2b show schematic diagrams illustrating an implementation to determine the modified area of union in the method of FIG. 1. In this implementation, the object and the adjacent objects are text strings containing characters and numerals, and the bounding boxes are interchangeably referred to textboxes. However, it will be appreciated by a person skilled in the art that text detection is just an example, and that the method can be applied to other types of object detection.

With reference to FIGS. 2a-2b, the predicted bounding box can be labeled as set A, the groundtruth bounding box of the object can be labeled as set B, and the groundtruth bounding boxes of adjacent objects can be labeled as sets C and D respectively. Given labeled validation data, the sizes and positions of B, C and D are known, while the size and position of A can vary based on the detection model used. While the bounding boxes of two adjacent objects are shown in this example, it will be appreciated that the calculation can be applied to a greater number of adjacent objects.

The modified area of union modified (A∪B) in step 106 of FIG. 1 can be represented as:

$$\text{modified}(A \cup B) = \text{weighted}(A \cup B) + A \cap C + A \cap D \qquad \text{(I)}$$

where weighted(A∪B) represents the weighted area of union between sets A and B, A∩C represents the intersection between sets A and C, and A∩D represents the intersection between sets A and D. The areas corresponding to A∩C and A∩D are shown in FIG. 2b.

Referring to FIG. 2a, while the standard area of union is the sum of the area of intersection (A∩B) and the areas of non-intersection (A1 and B1), the value of weighted (A∪B) in equation (I) is determined by taking into the consideration that, a greater B1 means a smaller intersection with the groundtruth bounding box, whereas a greater A1 leads to greater union. Therefore, in the present embodiments, B1 is penalized more than A1.

For example, weighted(A∪B) can be expressed as:

$$\text{weighted}(A \cup B) = w_1 A_1 + w_2 B_1 + (A \cap B) \qquad \text{(II)}$$

In equation (II), weights $w_1$ and $w_2$ are used to adjust penalties for A1 and B1. Greater B1 leads to smaller intersection, whereas greater A1 leads to greater union. Therefore, B1 should be penalized more, which means $w_1 < w_2$. The exact value of $w_1$ and $w_2$ may be selected based on e.g. practical data and may vary depending on the situation. In one non-limiting example, $w_1 + w_2 = 2$. The areas corresponding to A1, B1 and A∩B are shown in FIG. 2a.

By combining the above two equations (I) and (II):

$$\text{modified}(A \cup B) = + w_2 B_1 + (A \cap B) + A \cap C + A \cap D \qquad \text{(III)}$$

Referring to step 108 of FIG. 1, the score can be calculated as:

$$\text{score} = \frac{A \cap B}{\text{modified}(A \cup B)} = \frac{A \cap B}{w_1 A_1 + w_2 B_1 + (A \cap B) + A \cap C + A \cap D} \quad \text{(IV)}$$

In equations (III) and (IV), $w_1 < w_2$ and in one non-limiting example, $w_1 + w_2 = 2$.

As can be seen from the above equation (IV), while the numerator is the same as that used to determine the tradition IoU, the denominator is adapted to penalize (1) more on a small intersection between sets A and B and less on a greater union between sets A and B (as $w_1 < w_2$), and (2) any intersection between sets A and C or between sets A and D (as the components $A \cap C$ and $A \cap D$ are non-zero). In other words, the score is lower if either or both of conditions (1) and (2), which are indicative of a low performance by the object detection model, happen. Conversely, if there is a large intersection between sets A and B, and no intersection between sets A and C or between sets A and D, the score is high. A higher score (i.e. closer to 1) represents a better accuracy of the object detection model.

Figure 3:
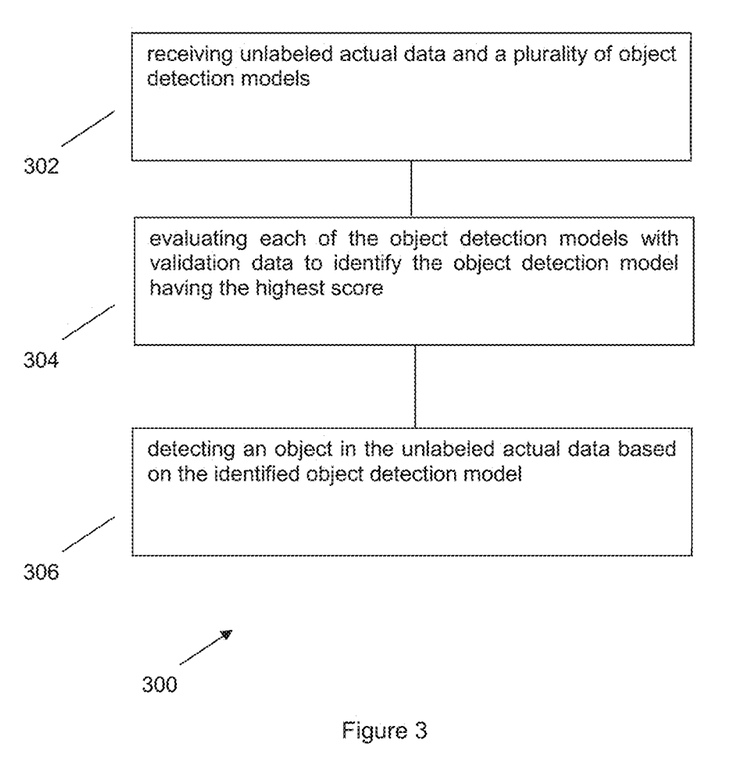
FIG. 3 shows a flow chart illustrating an object detection method according to an embodiment.

The evaluation method as described above can be used for object detection by first identifying the appropriate model for the detection task before using that model for the actual data to be analysed. FIG. 3 shows a flow chart 300 illustrating an object detection method according to an embodiment.

At step 302, unlabeled actual data and a plurality of object detection models are received. The object detection models may be generated by a neural network, e.g. a convolutional neural network, based on labeled training data. The unlabeled actual data may be in the form of image data of an optical image of the object. For example, the optical image may be a scanned document or a photograph of a document uploaded by a customer which contains textual information that the customer wishes to provide.

At step 304, given labeled validation data, each of the object detection models is evaluated using the method as described above with reference to FIGS. 1 and 2a-2b, to identify the object detection model having the highest score. At step 306, the identified object detection model is used to detect an object in the unlabeled actual data.

In an embodiment of the object detection method of FIG. 3, the object detection models in step 302 may have associated hyperparameters, and the object detection model with the associated hyperparameters having the highest score is identified in step 306. The identified model and associated hyperparameters are then used to detect the object in the unlabeled actual data.

Figure 4:
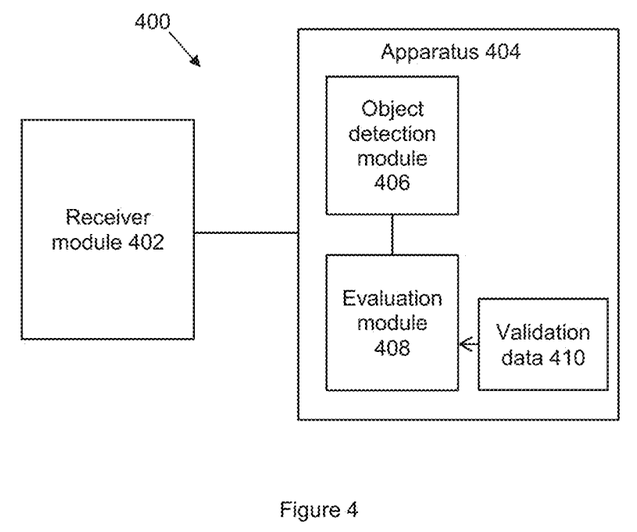
FIG. 4 shows a schematic diagram illustrating an object detector according to an embodiment.

FIG. 4 shows a schematic diagram illustrating an object detector 400 according to an embodiment. The object detector includes a receiver module 402 coupled to an apparatus 404. The apparatus 404 includes an object detection module 406 and an evaluation module 408. Typically, the evaluation module 408 is provided with a set of labeled validation data 410. The receiver module 402 is configured to receive unlabeled actual data and a plurality of object detection models. The object detection models are generated by a neural network based on labeled training data. The apparatus 404 can evaluate each of the object detection models based on the validation data to identify the object detection model having the highest score.

In an example, the object detection module 406 is configured to generate a predicted bounding box representing an object based on an object detection model. The object is positioned proximate to one or more adjacent objects. The evaluation module 408 is configured to determine an area of intersection between the predicted bounding box and a groundtruth bounding box of the object, and determine a modified area of union between the predicted bounding box and the groundtruth bounding box of the object. The modified area of union is a sum of a weighted area of union between the predicted and groundtruth bounding boxes based on one or more weights and an area of intersection between the predicted bounding box and at least one groundtruth bounding box of the one or more adjacent objects. The evaluation module 408 is further configured to determine a score equal to the area of intersection between the predicted bounding box and the groundtruth bounding box of the object divided by the modified area of union, and evaluate a performance of the object detection model based on the score. The steps are performed for each of the object detection models to identify the object detection model having the highest score.

The object detection module 406 is can then detect an object in the unlabeled actual data based on the identified object detection model.

The methods, systems and devices as described when applied to text detection can improve the performance of model selection in textbox detection and increase the final accuracy of OCR. A detection model that provides a small intersection between the predicted textbox and the groundtruth textbox of the target text string outputs data that may be incomplete or truncated. Likewise, a detection model that provides some degree of intersection between the predicted textbox and groundtruth textboxes of adjacent text strings outputs data that may be noisy or inaccurate. According to the present embodiments, such detection models have low evaluation scores and will not be selected. Instead, a model that provides a large intersection between the predicted textbox and the groundtruth textbox of the target text string, and no intersection between the predicted textbox and groundtruth textboxes of adjacent text strings, has a high evaluation score and will be selected. When used to detect textboxes in a real/actual optical image, the selected model can output accurate data which can help to improve the accuracy of subsequent OCR steps.

Figure 5:
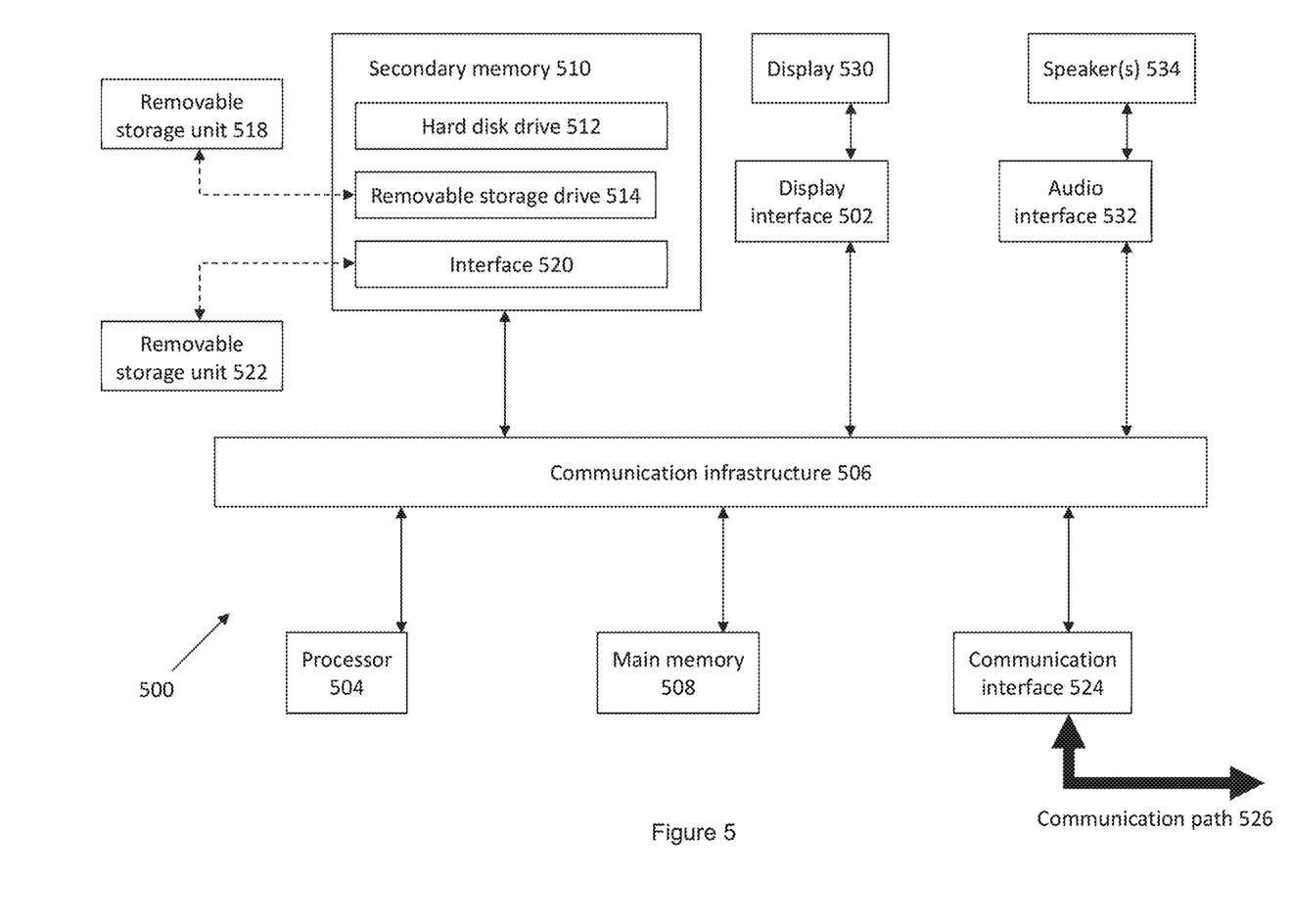
FIG. 5 shows a schematic diagram illustrating a computer system suitable in implementing the methods of FIGS. 1 and 3 and the object detector of FIG. 4.

FIG. 5 depicts an exemplary computing device 500, hereinafter interchangeably referred to as a computer system 500, where one or more such computing devices 500 may be used for the object detector 400 of FIG. 4, or for implementing some or all steps of the methods of FIGS. 1 and 3. The following description of the computing device 500 is provided by way of example only and is not intended to be limiting.

As shown in FIG. 5, the example computing device 500 includes a processor 504 for executing software routines. Although a single processor is shown for the sake of clarity, the computing device 500 may also include a multi-processor system. The processor 504 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a hard disk drive 512 and/or a removable storage drive 514, which may include a floppy disk drive, a magnetic tape drive, an optical disk drive, or the like. The removable storage drive 514 reads from and/or writes to a removable storage unit 518 in a well-known manner. The removable storage unit 518 may include a floppy disk, magnetic tape, optical disk, or the like, which is read by and written to by removable storage drive 514. As will be appreciated by persons skilled in the relevant art(s), the removable storage unit 518 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 520. Examples of a removable storage unit 522 and interface 520 include a program cartridge and cartridge interface (such as that found in video game console devices), a removable memory chip (such as an EPROM or PROM) and associated socket, and other removable storage units 522 and interfaces 520 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments of the inventions, the communication interface 524 permits data to be transferred between the computing device 500 and a data communication network, such as a public data or private data communication network. The communication interface 524 may be used to exchange data between different computing devices 500 which such computing devices 500 form part an interconnected computer network. Examples of a communication interface 524 can include a modem, a network interface (such as an Ethernet card), a communication port, an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

As shown in FIG. 5, the computing device 500 further includes a display interface 502 which performs operations for rendering images to an associated display 530 and an audio interface 532 for performing operations for playing audio content via associated speaker(s) 534.

As used herein, the term "computer program product" may refer, in part, to removable storage unit 518, removable storage unit 522, a hard disk installed in hard disk drive 512, or a carrier wave carrying software over communication path 526 (wireless link or cable) to communication interface 524. Computer readable storage media refers to any non-transitory tangible storage medium that provides recorded instructions and/or data to the computing device 500 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites and the like.

The computer programs (also called computer program code) are stored in main memory 508 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 504 to perform features of the above-described embodiments. Accordingly, such computer programs represent controllers of the computer system 500.

Software may be stored in a computer program product and loaded into the computing device 500 using the removable storage drive 514, the hard disk drive 512, or the interface 520. Alternatively, the computer program product may be downloaded to the computer system 500 over the communications path 526. The software, when executed by the processor 504, causes the computing device 500 to perform functions of embodiments described herein.

It is to be understood that the embodiment of FIG. 5 is presented merely by way of example. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

It will be appreciated that the elements illustrated in FIG. 5 function to provide means for performing the various functions and operations of the servers as described in the above embodiments.

In an implementation, a server may be generally described as a physical device comprising at least one processor and at least one memory including computer program code. The at least one memory and the computer program code are configured to, with the at least one processor, cause the physical device to perform the requisite operations.

It will be appreciated by a person skilled in the art that numerous variations and/or modifications may be made to the present invention as shown in the specific embodiments without departing from the spirit or scope of the invention as broadly described. For example, methods, systems and devices as described can be suitably adapted for different types of object detection, e.g. facial detection or vehicle detection. The present embodiments are, therefore, to be considered in all respects to be illustrative and not restrictive.

What is claimed is:

1. A computer-implemented method for evaluating performance of an object detection model, comprising:
  generating a predicted bounding box representing an object based on the object detection model, wherein the object is positioned proximate to one or more adjacent objects;
  determining an area of intersection between the predicted bounding box and a ground truth bounding box of the object;
  determining a modified area of union between the predicted bounding box and the ground truth bounding box of the object, wherein determining the modified area of union comprises:

determining, based on one or more weights, a weighted area of union between the predicted bounding box and the ground truth bounding box; and adding to the weighted area of union an area of intersection between the predicted bounding box and at least one ground truth bounding box of the one or more adjacent objects; and determining a score equal to the area of intersection between the predicted bounding box and the ground truth bounding box of the object divided by the modified area of union, wherein the score represents the performance of the object detection model.

2. The computer-implemented method of claim 1, wherein the object comprises a text string, and wherein the adjacent objects comprise adjacent text strings.

3. The computer-implemented method of claim 1, wherein the score with a value closer to 1 represents a higher accuracy of the object detection model.

4. The computer-implemented method of claim 1, wherein the one or more weights comprises:

a predetermined first weight associated with a portion of the predicted bounding box not intersecting with the ground truth bounding box of the object; and a predetermined second weight associated with a portion of the ground truth bounding box of the object not intersecting with the predicted bounding box, wherein the predetermined first weight is less than the predetermined second weight.

5. The computer-implemented method of claim 4, wherein determining the weighted area of union comprises:

assigning the predetermined first weight and the predetermined second weight to associated portions; and summing weighted areas of the associated portions with the area of intersection between the predicted bounding box and the ground truth bounding box of the object.

6. A non-transitory, computer-readable medium storing one or more instructions executable by a computer system to perform one or more operations for evaluating performance of an object detection model, comprising:

generating a predicted bounding box representing an object based on the object detection model, wherein the object is positioned proximate to one or more adjacent objects;

determining an area of intersection between the predicted bounding box and a ground truth bounding box of the object;

determining a modified area of union between the predicted bounding box and the ground truth bounding box of the object, wherein determining the modified area of union comprises:

determining, based on one or more weights, a weighted area of union between the predicted bounding box and the ground truth bounding box; and adding to the weighted area of union an area of intersection between the predicted bounding box and at least one ground truth bounding box of the one or more adjacent objects; and determining a score equal to the area of intersection between the predicted bounding box and the ground truth bounding box of the object divided by the modified area of union, wherein the score represents the performance of the object detection model.

7. The non-transitory, computer-readable medium of claim 6, wherein the object comprises a text string, and wherein the adjacent objects comprise adjacent text strings.

8. The non-transitory, computer-readable medium of claim 6, wherein the score with a value closer to 1 represents a higher accuracy of the object detection model.

9. The non-transitory, computer-readable medium of claim 6, wherein the one or more weights comprises:

a predetermined first weight associated with a portion of the predicted bounding box not intersecting with the ground truth bounding box of the object; and a predetermined second weight associated with a portion of the ground truth bounding box of the object not intersecting with the predicted bounding box, wherein the predetermined first weight is less than the predetermined second weight.

10. The non-transitory, computer-readable medium of claim 9, wherein determining the weighted area of union further comprises one or more instructions for:

assigning the predetermined first weight and the predetermined second weight to associated portions; and summing weighted areas of the associated portions with the area of intersection between the predicted bounding box and the ground truth bounding box of the object.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for evaluating performance of an object detection model, comprising:

generating a predicted bounding box representing an object based on the object detection model, wherein the object is positioned proximate to one or more adjacent objects;

determining an area of intersection between the predicted bounding box and a ground truth bounding box of the object;

determining a modified area of union between the predicted bounding box and the ground truth bounding box of the object, wherein determining the modified area of union comprises:

determining, based on one or more weights, a weighted area of union between the predicted bounding box and the ground truth bounding box; and adding to the weighted area of union an area of intersection between the predicted bounding box and at least one ground truth bounding box of the one or more adjacent objects; and determining a score equal to the area of intersection between the predicted bounding box and the ground truth bounding box of the object divided by the modified area of union, wherein the score represents the performance of the object detection model.

12. The computer-implemented system of claim 11, wherein the object comprises a text string, and wherein the adjacent objects comprise adjacent text strings.

13. The computer-implemented system of claim 11, wherein the score with a value closer to 1 represents a higher accuracy of the object detection model.

14. The computer-implemented system of claim 11, wherein the one or more weights comprises:

a predetermined first weight associated with a portion of the predicted bounding box not intersecting with the ground truth bounding box of the object; and a predetermined second weight associated with a portion of the ground truth bounding box of the object not intersecting with the predicted bounding box, wherein the predetermined first weight is less than the predetermined second weight.

15. The computer-implemented system of claim 14, wherein determining the weighted area of union comprises one or more operations for:
   assigning the predetermined first weight and the predetermined second weight to associated portions; and
   summing weighted areas of the associated portions with the area of intersection between the predicted bounding box and the ground truth bounding box of the object.

* * * * *